United States Patent
Mansfield et al.

(10) Patent No.: US 7,899,826 B2
(45) Date of Patent: *Mar. 1, 2011

(54) SEMANTIC RECONSTRUCTION

(75) Inventors: Philip Andrew Mansfield, Vancouver (CA); Michael Robert Levy, Vancouver (CA); Yuri Khramov, Richmond (CA); Darryl Will Fuller, Burnaby (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,118

(22) Filed: Aug. 31, 2009

(65) Prior Publication Data
US 2009/0327285 A1 Dec. 31, 2009

Related U.S. Application Data

(63) Continuation of application No. 11/407,448, filed on Apr. 19, 2006, now Pat. No. 7,603,351.

(51) Int. Cl.
*G06F 17/30* (2006.01)
*G10L 15/06* (2006.01)

(52) U.S. Cl. ..................................... 707/737; 704/244
(58) Field of Classification Search ....................... None
See application file for complete search history.

(56) References Cited

U.S. PATENT DOCUMENTS

| | | | |
|---|---|---|---|
| 6,901,403 B1 * | 5/2005 | Bata et al. | 1/1 |
| 2005/0203924 A1 * | 9/2005 | Rosenberg | 707/100 |
| 2006/0248053 A1 * | 11/2006 | Sanfilippo et al. | 707/3 |

* cited by examiner

*Primary Examiner*—Neveen Abel Jalil
*Assistant Examiner*—Tarek Chbouki
(74) *Attorney, Agent, or Firm*—Van Pelt, Yi & James LLP

(57) ABSTRACT

Determining a semantic relationship is disclosed. Source content is received. Cluster analysis is performed at least in part by using at least a portion of the source content. At least a portion of a result of the cluster analysis is used to determine the semantic relationship between two or more content elements comprising the source content.

17 Claims, 8 Drawing Sheets

Pages 2

700

Take it from the template.

Let Pages showcase your ideas with more than 60 easy-to-use, Apple-designed templates -- 25 brand new to Pages 2.

From simple letters and invitations to media-rich newsletters and flyers, templates make it a snap to add your own text, photos, and graphics, so you can focus on content, not design.

When you launch Pages, simply choose the template you want (even a blank template for simple word processing). Each template includes complementary page layouts for different page styles, including cover pages, back pages, feature stories with sidebars, and text pages. Templates also include paragraph and list styles and fully coordinated fonts, colors, tables, and charts.

Text and image placeholders make it easy to add your content just by dragging and dropping. And you can customize your text flow with multiple columns, section breaks, and page breaks.

New templates in Pages 2 include large-and small-format posters, flyers, scrapbooks, folding cards, technical reports, business invoices, proposals, screenplays, and storyboards. New photo placeholders let you add masks to crop or frame images. And business invoice templates include tables that automatically calculate invoice totals based on quantity, unit price, and more, so you can keep all your facts and figures straight without sacrificing design.

FIG. 7

Pages 2

Take it from the template.

Let Pages showcase your ideas with more than 60 easy-to-use, Apple-designed templates -- 25 brand new to Pages 2.

From simple letters and invitations to media-rich newsletters and flyers, templates make it a snap to add your own text, photos, and graphics, so you can focus on content, not design.

When you launch Pages, simply choose the template you want (even a blank template for simple word processing). Each template includes complementary page layouts for different page styles, including cover pages, back pages, feature stories with sidebars, and text pages. Templates also include paragraph and list styles and fully coordinated fonts, colors, tables, and charts.

Text and image placeholders make it easy to add your content just by dragging and dropping. And you can customize your text flow with multiple columns, section breaks, and page breaks.

New templates in Pages 2 include large-and small-format posters, flyers, scrapbooks, folding cards, technical reports, business invoices, proposals, screenplays, and storyboards. New photo placeholders let you add masks to crop or frame images. And business invoice templates include tables that automatically calculate invoice totals based on quantity, unit price, and more, so you can keep all your facts and figures straight without sacrificing design.

FIG. 8

SEMANTIC RECONSTRUCTION

CROSS REFERENCE TO OTHER APPLICATIONS

This application is a continuation of co-pending U.S. patent application Ser. No. 11/407,448, entitled SEMANTIC RECONSTRUCTION filed Apr. 19, 2006, which is incorporated herein by reference for all purposes.

BACKGROUND OF THE INVENTION

Often electronic content data do not consistently adhere to one standard on format, organization, and use in consistent software. For example, each individual content data creator may choose to save electronic content data in various formats. This heterogeneous nature of the electronic content data can pose challenges when various content need to be extracted, edited, re-purposed, re-styled, searched, combined, transformed, rendered or otherwise processed. Content may be encoded at an inconsistent and/or inappropriate semantic level. In some cases, a PDF (Portable Document Format) document is generated from a virtual printer driver and includes geometrical properties of content elements, e.g., a vector graphic, bitmap, or other description of such content elements, but does not include higher-level semantic structure. For example in a document containing text, text flow of lines in the same horizontal position of two separate columns can be incorrectly flowed together as a single line. This causes extraction of a single column, e.g., to "copy" and "paste" to another document a paragraph in a particular column, to be difficult. In some cases when converting the format of the content, many standard tools for format conversion operate in a manner that can potentially cause semantic information needed to perform desired processing, for example, to be lost. Therefore, there exists a need for a better way to reconstruct semantics of content.

BRIEF DESCRIPTION OF THE DRAWINGS

Various embodiments of the invention are disclosed in the following detailed description and the accompanying drawings.

FIG. 7 is a diagram illustrating an example of a source content document.

FIG. 8 is a diagram illustrating an example of a document with grouped content elements.

DETAILED DESCRIPTION

Figure 1:
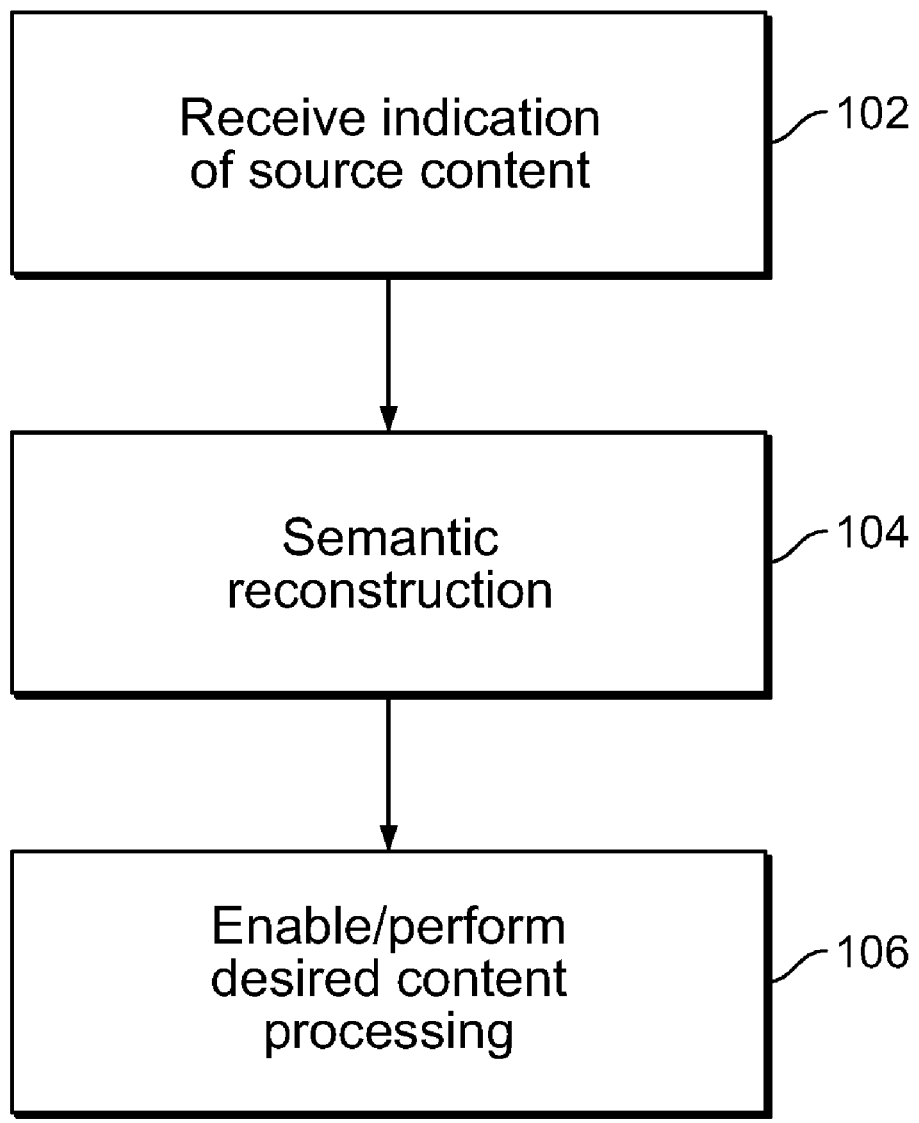
FIG. 1 is a flow chart illustrating an embodiment of a process for preparing content for desired processing.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reconstructing semantic information is disclosed. In some embodiments, cluster analysis is performed to determine one or more semantic relationships between content elements comprising a source content, such as a file or document. In the case of text, for example, characters (glyphs) are associated together to identify words, words are grouped into paragraphs, paragraphs (and/or parts thereof) into columns, etc. In some embodiments, region finding algorithms are used to group text and/or other content items into associated regions. In some embodiments, semantic reconstruction is performed to facilitated editing, reusing, reformatting, repurposing, etc. of content at an appropriate and/or desired semantic level.

In some embodiments, a glyph includes either a text glyph (e.g., representing one or more characters) or an inline object such as an image, symbol or shape that flows with the neighboring text. In some embodiments, a word includes one or more glyphs intended to be read as a unit. For example, words are in a dictionary, hyperlinks, abbreviations, numbers, dates in some formats, and single or grouped inline images. In some embodiments, a text line includes sequences of words that span a (e.g., straight) line in the text progression direction (horizontal, left to right or right to left in some examples) In some embodiments, a text line is intended to be read in order, such as those that form part of a sentence, phrase, title, name, list item or table cell entry.

FIG. 1 is a flow chart illustrating an embodiment of a process for preparing content for desired processing. At 102, an indication of source content is received. The indication may be specified by a user, preconfigured, automatically configured (e.g., configuration at least in part performed by an automatic process), and/or dynamically configured (e.g., configuration based upon dynamic data). In some embodiments, the source content includes data encoded using one or more of the following formats: a text format, a document format, a spread sheet format, a presentation format, a visual graphic format (e.g. chart, graph, map, drawing, image formats), an audio format, a multimedia (e.g. video) format, and a database format. In various embodiments, the source content is in an encoding native to one or more content-editing programs, such as Microsoft Word, Excel or PowerPoint, or created indirectly from the content-editing programs, saved in a format such as PDF (Portable Document Format). In some embodiments, the source content includes data derived from one or more format conversions and/or content aggregation. In some case, the source content is missing semantic structure information and/or contains misleading structure information. An example of source content that is missing structure information is a PDF file created from a virtual printer driver, in which text characters and other content elements are encoded as graphics located in a particular place on the page. An example of source content that contains misleading structure information is a HTML content in which cells of a table have been used to position elements on a page rather than to organize the elements based on some semantic or other relationship between them.

At 104, semantic reconstruction is performed on the source content. In some embodiments, semantic reconstruction includes up-converting the source content to a meta-language encoded representation. Up-conversion includes converting the starting content into a higher semantic encoding. In some embodiments, semantic data included, expressly or implicitly, in and/or otherwise associated with, the source content data is used at least in part to convert the starting content to a higher semantic encoding. Up-conversion includes reconstruction of semantic structure. The reconstruction, in some embodiments, includes reconstructing the semantic structure of the original encoding and adding additional semantic encoding beyond what was present in the original encoding. In some embodiments, the starting content is up-converted using a content profile data that is associated with at least one rule for converting encodings. In some embodiments, formatting and/or text and/or outline hierarchy data is used to up-convert, e.g., by identifying and processing differently text that is in title case or formatted in a manner commonly used to distinguish major headings from other text. By up-converting content data, various desired content processing can be enabled. For example, advanced search functions such as when searching an invoice content, fields such as "items", "quantity", "price" and "description" can be automatically extracted from the source content for inclusion as fields in a search dialog.

At 106, desired content processing is enabled and/or performed. Enabling the desired content processing includes performing one or more operations to enable the desired content processing to be performed. In some embodiments, the desired content processing includes one or more of the following: importing, selecting, copying, pasting, extracting, editing, re-purposing, re-styling, searching, combining, transforming, rendering or otherwise processing data. In some embodiments, the desired content processing is enabled/performed using the semantics reconstructed in 104. For example, the source content editing is enabled/performed in the semantically reconstructed font/text flow pattern of the source content.

Figure 2:
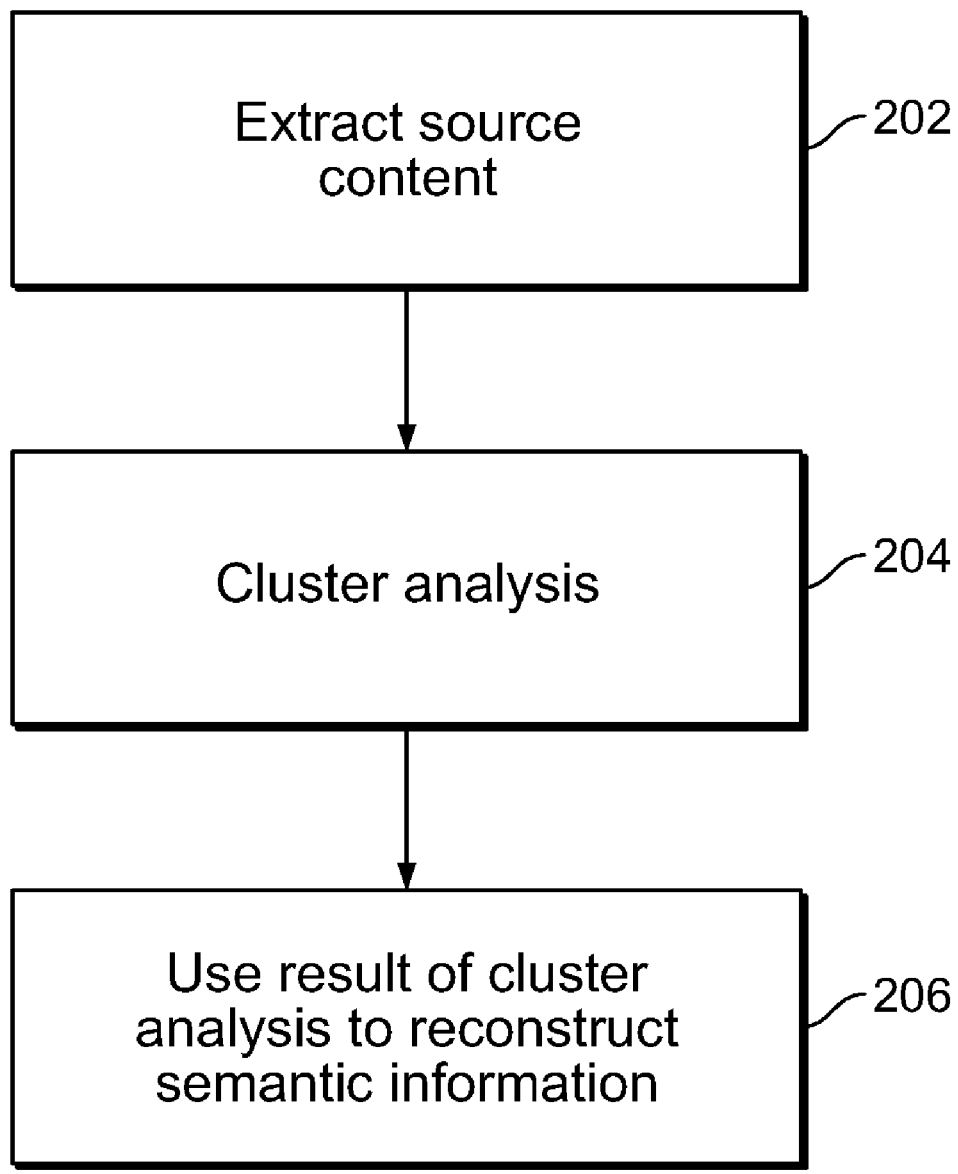
FIG. 2 is a flow chart illustrating an embodiment of a process for reconstructing semantic information of content.

FIG. 2 is a flow chart illustrating an embodiment of a process for reconstructing semantic information of content. In some embodiments, the process of FIG. 2 is included in 104 of FIG. 1. At 202, source content is extracted. In some embodiments, the source content is associated with the source content in 102 of FIG. 1. Extracting the source content includes parsing and/or reading data for use in semantic reconstruction. In some embodiments, extracting the source content includes preparing the source content for performing cluster analysis. At 204, cluster analysis is performed. In some embodiments, cluster analysis includes performing processing associated with grouping elements of similar kind into respective groups/categories. In some embodiments, cluster analysis includes sorting elements into groups in a manner that the statistical significance between two elements is larger if they belong to the same group and than otherwise. For example, characters on a document are grouped into words, words are grouped into paragraphs, and paragraphs (and parts thereof) make up columns, etc. At 206, the result of the cluster analysis is used to reconstruct semantic information. In some embodiments, reconstructing the semantic information includes encoding semantic structure to at least a portion of data associated with the source content. For example, adjacent characters are gathered to form a word group and side-by-side text boxes are recognized as columns of text.

Figure 3:
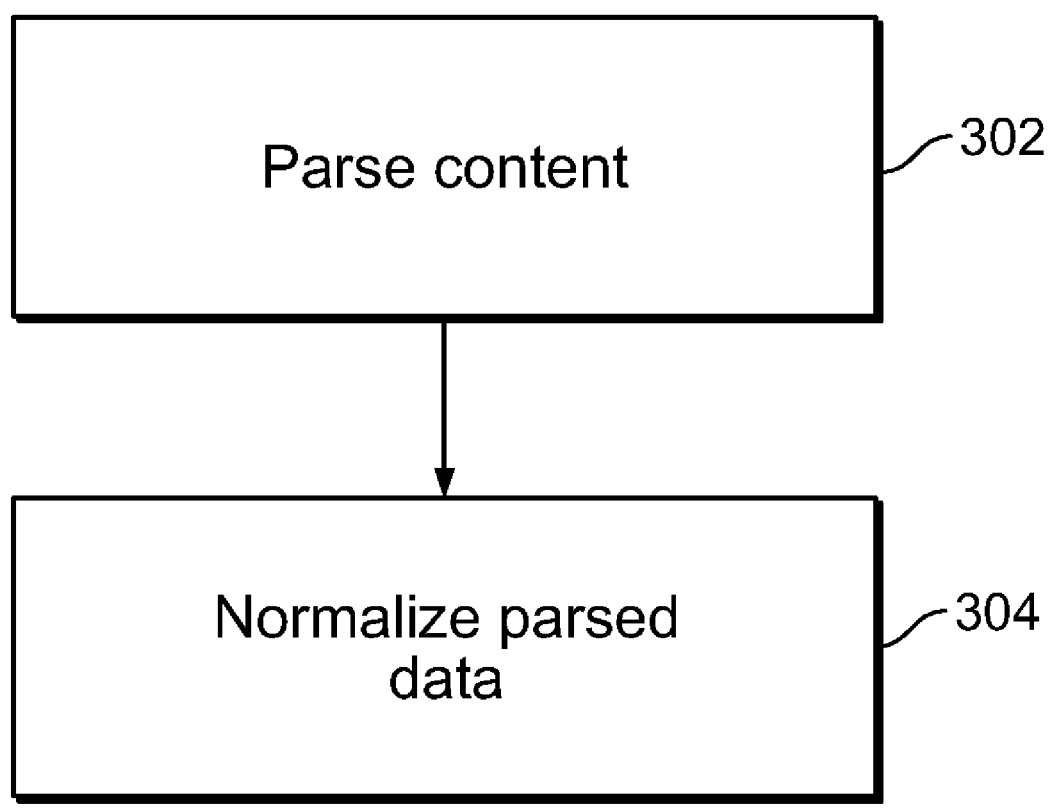
FIG. 3 is a flow chart illustrating an embodiment of a process for extracting content.

FIG. 3 is a flow chart illustrating an embodiment of a process for extracting content. In some embodiments, the process of FIG. 3 is included in 202 of FIG. 2. At 302, content is parsed. In some embodiments, parsing includes extracting layout and attribute information of the content. Layout information includes information associated with placement of content elements, e.g., within a page or other space. For example, indents, sidebars, column gaps, and lines (borders, dividers, etc.) used in the layout for both aesthetic and semantic structure of the document are extracted. Attribute information includes one or more visual aspects/attributes of content elements comprising the content. For example, attribute information including color, font, and style of one or more glyphs of the content are extracted. In some embodiments, parsing content includes creating an in-memory representation of at least a portion of the content. At 304, the parsed data is normalized. In some embodiments, the normalization includes processing the parsed data to a standard format and/or a format associated with cluster analysis. In some embodiments, normalization includes standardizing representation of at least a portion of the source content. For example, text runs/order is eliminated, sub-paths are eliminated, fills and strokes are unified, and transformations are flattened. In some cases by normalizing the parsed data, cluster analysis can be performed on the parsed content in a more efficient manner. In some embodiments, normalization is performed as elements are processed. Alternate input elements that yield a common visual effect are represented in a common way. For example, if two lines with identical attributes (e.g., width, stroke color) adjoin, the lines are replaced by a single line. Elements associated with no visual effect such as space characters and transparent shapes are removed.

In some embodiments, a drawing format is defined to be a format that encodes one or more visual attributes (e.g., text font and style, line thickness, fill pattern, etc.) and layout (e.g., coordinates on the page, transformations applied, z-order, etc.), but not structure (e.g., word, paragraph, column, table, list, title, author, section, header, footer, caption, footnote). In some cases, PDF (Portable Document Format) and SVG (Scalable Vector Graphics) are examples of drawing formats. With drawing formats, it is possible to have many different encodings that appear exactly the same when rendered. For example, a black rectangle with dimensions 100× 50 and no border will appear exactly the same as a straight line segment of length 100 with stroke color black and stroke thickness 50. In some embodiments, there exists a need to identify the same semantics in two encodings that render the same. In some embodiments, this is facilitated by mapping many encodings to a single, common, canonical encoding, and writing semantic reconstruction algorithms that act on the canonical encoding. The process of mapping to a canonical encoding in some embodiments is termed normalization. In some embodiments, normalization of a drawing format includes one or more of the following steps: Remove space characters; Replace character strings with individually positioned characters; Re-order characters by primary sort on y value, secondary sort on x value; Separate multi-curve paths into individual curves; Eliminate unnecessary intermediate vertices from straight lines; Adjoin abutting rectangles that can be combined into a single rectangle; Unify fills and strokes; Flatten transformations (e.g., compose all nested coordinate transformations and apply the result to determine final positions of objects).

Figure 4:
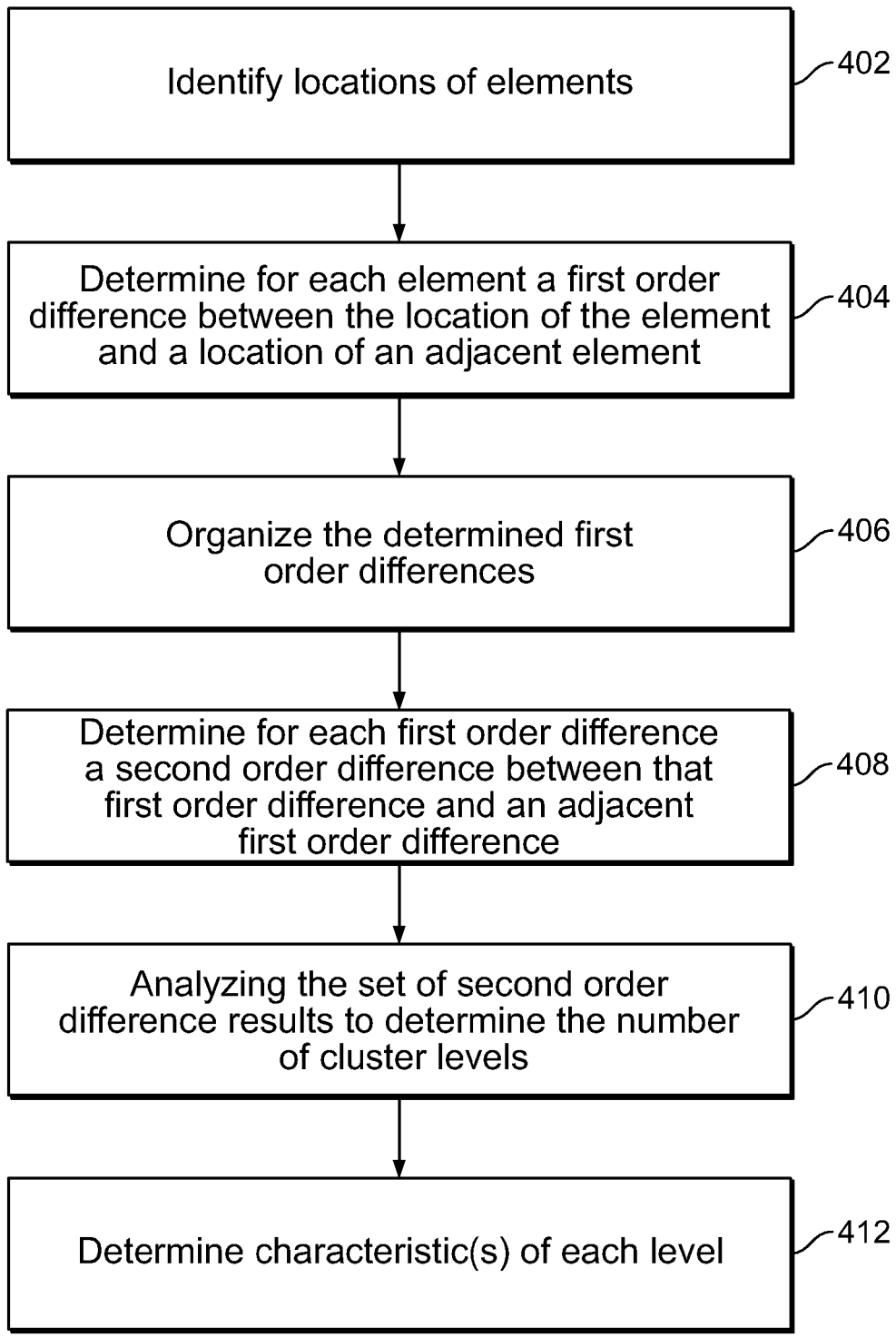
FIG. 4 is a flow chart illustrating an embodiment of a process for performing difference cluster analysis.

FIG. 4 is a flow chart illustrating an embodiment of a process for performing difference cluster analysis. Many forms of cluster analysis require foreknowledge of the number of groups/clusters since there may exists multiple levels/hierarchies of clustering. For example, when using cluster analysis to group celestial objects, a specification of the number of clusters determines whether the cluster analysis will group objects on the level of planets, solar systems, or galaxies. However when using cluster analysis to discover the structural relationships between elements of content, for example, the number of groups are not known in many cases. For example, it cannot be assumed in the case of a page of text, with no other graphics, that content elements comprise characters that make up words, that combine to form lines, groups of which form paragraphs, because the document may have two or more columns of text, such that a given line of text may include parts of two or more paragraphs.

In some embodiments, cluster analysis is a set of techniques that can be applied to a collection of data points to group points into clusters that are closer to each other than to the points of another cluster. In some embodiments, cluster analysis is applied to data points that represent the horizontal and vertical gaps between objects such as glyphs, words and text lines. For example, k-means cluster analysis is used. Starting with a collection of numbers $(p_1, \ldots, p_N)$ representing spatial gaps, and a known value for k (the number of clusters), the technique is used to partition the numbers into k clusters $C_1, \ldots, C_k$ defined by inequalities of the form $C_j = \{p_i | a_j \leq p_i < a_{j+1}\}$ where $a_1, \ldots a_{k+1}$ is an increasing sequence. Before applying the k-means technique, the differences $p_{i+1} - p_i$ are sorted by size and the k-1 largest differences are taken to be the partition points. For example, if $p_{i+1} - p_i$ is one of the k-1 largest differences, then $p_{i+1}$ is in a different cluster from $p_i$, and $p_{i+1}$ is one of the successive values $a_j$. k-means cluster analysis is then applied to repeatedly refine the clusters. The k-means technique involves taking the mean of the numbers in each cluster, then re-distributing the $p_i$ into clusters by associating them with the closest calculated mean. This is performed repeatedly until it causes no change in the clusters or their means.

In some embodiments, a technique disclosed and referred to herein as "difference clustering" is used to determine the number of levels of structural relationships that exist between content elements comprising a given source content and/or one or more hierarchical relationships between such levels, as well as one or more characteristics that can be used to determine whether a content element is related to another content in each of the determined levels. In some embodiments, "difference clustering" utilizes the k-means technique together with other techniques. In the example shown in FIG. 4, differences between positions of content elements (spacing) are analyzed using difference clustering analysis. In some embodiments, by analyzing the spacing between content elements, the content elements can be grouped at least in part using the grouping data of the spacing. In various embodiments, each directional component of spacing is analyzed separately. For example, difference clustering analysis on the horizontal component is used to distinguish between character spacing, word spacing, and column spacing, and difference clustering analysis on the vertical component is used to distinguish line spacing, paragraph spacing, and text box spacing. The process of FIG. 4 illustrates difference clustering analysis for a single directional component, and the process may be used again to analyze one or more additional directional components. In some embodiments, the results of performing difference cluster analysis along one or more dimensions are combined together to determine the structural relationships between content elements at one or more levels.

At 402, locations of elements are identified. In various embodiments, the elements include characters, glyphs, images, lines, drawings, boxes, cells, margins, and/or various other content elements. In some embodiments, locations of the elements include determining and/or assigning one or more location coordinate components to the elements. In some embodiments, the locations of the elements are organized in an order. For example when analyzing the horizontal spacing of characters, the characters are organized in increasing horizontal coordinate order for each line of characters. In some embodiments, the location coordinate values of the elements are desired to be associated with the spacing between the elements, and the location values are compensated for the width/length of the element. For example, when determining a compensated horizontal coordinate (x-coordinate) value for an element in the n-th position of an organized order of elements, the following formula is used.

$$X'_n = X_n - \sum_{i=1}^{n-1} W_i$$

X'n is the compensated location coordinate value, Xn is the original location coordinate value, and Wi is width of an element in the i-th position.

At 404, for each element, a first order difference between the location of the element and a location of an adjacent element is determined. In some embodiments, an element is adjacent to another element if the two elements with at least one same location coordinate component value are ordered next to each other in at least one other location coordinate component value. For example, two glyphs are adjacent to each other if both of the glyphs belong to the same text line and no other glyph exists between them. In some embodiments, two elements have at least one same location coordinate component if the difference between corresponding location coordinate component values of the elements is below a limit value or within a range value. In various embodiments, an element is adjacent to another element if the two elements are next to each other in an order and/or organization associated with the identified locations of the elements. In some embodiments, the first order difference between the locations is the difference between the width/length compensated location coordinate values. For example, when determining the difference between compensated horizontal coordinate (x-coordinate) values for the adjacent elements in the n-th and n+1 position of an organized order of compensated horizontal coordinates, the following formula is used.

$$\Delta X_n = X'_{n+1} - X'_n$$

In some embodiments, the first order difference is associated with the gap spacing between glyphs in the content.

At 406, the determined first order differences are organized. In some embodiments, organizing the first order difference includes ordering the first order differences in an increasing order. In some embodiments, organizing the first order differences includes assigning a weight value to one or more of the first order differences and organizing the first order differences at least in part by using the weight value(s). For example, in some embodiments, actual glyph spacing is divided by expected glyph spacing for each specific pair of glyphs given the font that is used, and its font metrics including size, default letter spacing and the table of kerning values stored with the font file. This ratio of actual to expected spacing is ordered by increasing value, and the values of this ratio are used in place of the first order differences throughout the remainder of the difference clustering method.

At 408, for each first order difference, a second order difference between that first order difference and an adjacent first order difference is determined to yield a set of second order difference results. In some embodiments, a first order difference is adjacent to another first order difference if the two first order differences are next to each other in an order and/or organization associated with the organization in 406. For example, when determining the second order difference between first order differences in an i-th and i+1 position of an organized order of first order differences, the following formula is used, where $\Delta^2 X_i$ is i-th second order difference, $\Delta X_{(i)}$ is the first order difference in the i-th position of an organized list of first order differences, and $\Delta X_{(i+1)}$ is the first order difference in the i+1 position of the same organized list of first order differences.

$$\Delta^2 X_i = \Delta X_{(i+1)} - \Delta X_{(i)}$$

In some embodiments, the second order differences are associated with differences between the spacing of glyphs.

At 410, the set of second order difference results are analyzed to determine the number of clustering levels. In some embodiments, analyzing the second order differences includes organizing the determined second order differences. In some embodiments, organizing the second order difference includes ordering the second order differences in an increasing order and/or plotting the second order differences in an order of increasing second order difference values. In some embodiments, organizing the second order difference includes assigning a weight value to one or more of the second order difference. In some embodiments, organizing the second order difference includes grouping the second order differences into one or more groups. In some embodiments, the second order differences are each categorized as either an inter-group difference or an intra-group difference. Intra-group differences are associated with relatively smaller second order difference values and can represent second order differences of first order differences within the same clustering group. An example of an intra-group difference is the relatively small variation one would expect to find in the character-width compensated spacing between letters in the same word. Inter-group differences are associated with relatively larger difference values and can represent second order differences of first order differences between different clustering groups. An example of an inter-group difference is the relatively large difference between the space between two words, on the on hand, and the space between two letters in the same word, on the other. In some embodiments, the categorization of second-order differences into intra-group and inter-group values is achieved by applying 2-means cluster analysis to the ordered second-order difference values; specifically, taking $(p_1, \ldots, P_N)$ to be $\{\Delta^2 X_1, \ldots, \Delta^2 X_N\}$ in increasing order. Similarly, any other technique of cluster analysis that is sufficient to distinguish two clusters of data values can be applied to the ordered second-order difference values. The intra-group differences are then in the first cluster $C_1 = \{p_i | a_1 \leq p_i < a_2\}$, and the inter-group differences are in the second cluster $C_2 = \{p_i | a_2 \leq p_i < a_3\}$, where $a_1 < a_2 < a_3$. In some embodiments, the number of levels into which content elements are determined to be organized, based on their spatial relationships analyzed as described above, is one more than the number of inter-group differences found through difference cluster analysis. For example, if two inter-group differences exist, the number of structural levels is three. Taking a simple example, consider characters that form words comprising a single line of text. The first order differences in the spacing between characters in the x-x-direction would yield a second order difference between character spacing and word spacing (one inter-group difference), indicating two levels of structure (words and lines). If the text had been in two columns, a further second order difference (between word spacing and column spacing) would have been detected, for a total of two inter-group differences, indicating three structural levels in the x-direction (words, lines, and columns). Repeating the analysis in the y-direction and combining results would, if applicable to the particular content, identify in some embodiments any further structural levels (e.g., paragraphs, etc.) that are manifested in the spacing between characters and groups of characters.

At 412, characteristic(s) of each cluster level is determined. In some embodiments, determining the characteristic includes determining which first order difference (and/or what range of first order differences) is associated with which cluster level. In some embodiments, determining the characteristic includes computing a statistical value associated with the first order differences associated with a cluster level. For example, by determining the average, minimum, maximum of the portion of first order differences associated with a cluster level, the average, minimum, and maximum spacing between glyphs in the content can be determined.

Let L be the number of levels of clustering. In some embodiments, L is computed by counting the number of points in the second cluster of second-order differences and adding 1. Next, the groups of first-order differences corresponding to each level can be identified, and the clusters of compensated $X_n'$ values can be identified at each level, for example, in one of these two ways:

(i) Perform L-means cluster analysis on the first-order differences. The resulting L clusters are the groups of first-order differences corresponding to each level. Next the number $K_m$ of clusters of $X_n'$ at level m are computed by adding the number of points in the (m+1)th, (m+2)th, . . . , and Lth clusters of first-order differences plus 1. Finally, perform $K_m$-means analysis on the compensated $X_n'$ values to produce the $K_m$ clusters at level m.

(ii) When originally computing each first-order difference $\Delta X_n = X_{n+1}' - X_n'$, store its value together with the index n that can be used to identify either one of the pair of successive X values that were subtracted to produce that difference. Store the value and the index reference in a single "first-order difference" data structure. Similarly, when originally computing each second-order difference, store its value together with an index reference that can be used to identify either one of the pair of successive "first-order difference" data whose values were subtracted to produce that difference. Now, for each second-order difference that is in the second cluster (i.e. for each inter-group difference), use its index reference to identify a partition point in the first-order differences. This means that the index identifies a pair of first-order difference values that are partitioned to be in separate clusters. Partitioning in this way produces L clusters of first-order differences corresponding to the L levels of clustering in the original data.

Now here is how to identify the clusters of $X_n'$ values at level n: For each first-order difference data in the (m+1)th, (m+2)th, ..., and Lth cluster of first-order differences, use its index reference as a partition point in the $X_n'$ values.

Figure 5:
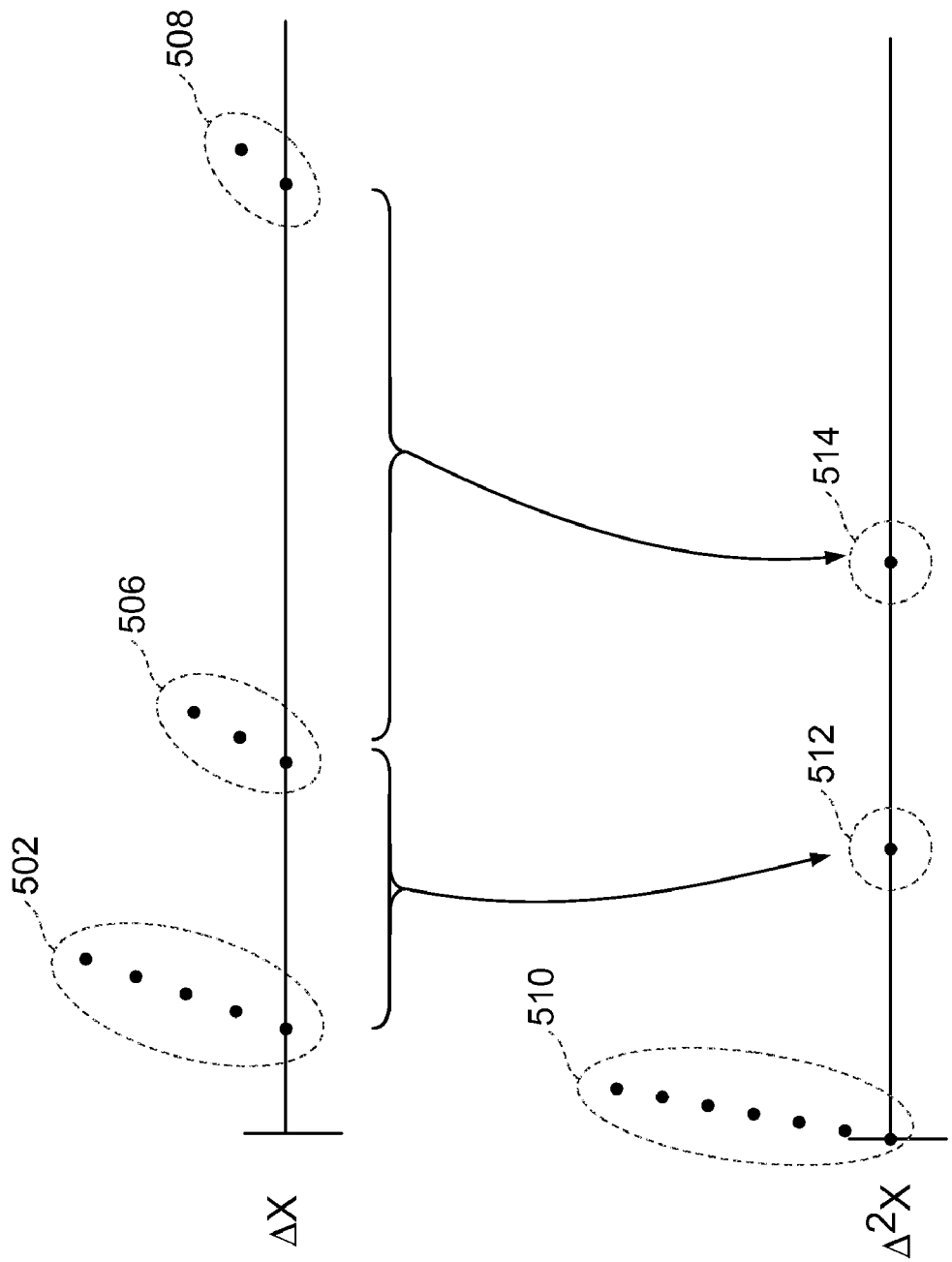
FIG. 5 is a diagram illustrating an example of difference clustering.

FIG. 5 is a diagram illustrating an example of difference clustering. In some embodiments, the example of FIG. 5 is associated with the process of FIG. 4. Groups of first order difference values 502, 506, and 508 are plotted in order from lowest value to highest value on a line associated with first order difference values. Each point is associated with a difference value, e.g., the distance from a text character or other glyph to an adjacent one, and in FIG. 5 the points are not super-imposed on top of each other to illustrate the example clearly. In the example shown, the dots are associated with horizontal spacing between glyphs. By ordering the first order difference values, the example illustrates three groups of first order difference values 502, 506, and 508. First order difference value group 502 is associated with spacing between glyphs that compose words. First order difference value group 506 is associated with spacing between words. First order difference value group 508 is associated with spacing between columns. For each pair of adjacent first order difference values, a second order difference value (i.e., the difference between one first order difference and an adjacent first order difference) is determined and plotted in an increasing order on a line associated with second order difference values. Second order difference value group 510, point 512, and point 514 each contain one or more points associated with the second order difference values. In some embodiments, point 512 is a member of a group of associated second order difference points comprising a second order difference value group. In some embodiments, point 514 is a member of a group of associated second order difference points comprising a second order difference value group. In some embodiments, 510 is identified as one cluster, and 512 together with 514 is identified as a second cluster. Second order difference values between the first order difference values within the same single first order difference value group (intra-group differences) are included in second order difference value group 510. In a text document, for example, typically the character-width compensated spacing between characters within a word, or in the spacing between different pairs of words, varies only slightly. The second order difference between inter-group adjacent points in group 502 and 506 is included in point 512. The second order difference between inter-group adjacent points in group 506 and 508 is included in point 514. Since there exists two inter-group second order difference values in the example, there are two plus one (three) grouping levels (in this example, words, sentences or parts thereof on a line of text within a column, and columns). By determining the minimum and maximum of the first order difference values in group 502, minimum and maximum spacing between glyphs that compose words can be determined, and similarly group 506 and 508 can be used to determine word spacing and column spacing respectively. In some embodiments, the minimum and maximum spacing associated with each grouping level is used to group content elements, text characters (glyphs) in this example, accordingly, such as by identifying groups of characters that comprise words, group words into lines of text within a column, etc. By using data determined from cluster analysis, the glyphs are grouped into the determined levels of groupings. It is possible to perform the analysis quickly and automatically with respect to any arbitrary content, e.g., using a computer, in part because it is not necessary to know in advance how many grouping levels there are in the structure of the content or other collection of elements being analyzed. Regardless of the number of grouping levels, the number of levels is determined in just two processing steps. By determining the average of the first order difference values in group 502, the average spacing between glyphs that compose words can be determined. Similarly, other statistical quantities can be determined for the glyphs that compose words. Similarly, an analysis of the first order difference values in group 506 and 508 can be used to determine statistical quantities relevant to word spacing and column spacing. In some embodiments these statistical quantities are used as input to clauses that evaluate to true or false. In some embodiments the clauses are combined with other clauses that have other inputs using logical operators, and when the resulting value is true, an action is triggered. The collection of rules that associate logical expressions with actions together constitute what we call a "profile", and profiles can be used to adapt the semantic reconstruction procedure based on document source and format, statistical quantities derived from the document, identified region types, identified document types, and other criteria.

While the examples described in detail herein deal primarily with determining the structure of a document or other electronically represented content, the difference clustering analysis may be applied to any set of data elements to determine, based on distances or any difference that can be represented or expressed as a distance or other numerical and/or spatial difference, the structural and/or other relationship between data elements. In some embodiments, cluster analysis is used in a wide variety of applications, both scientific and economic. For example, cluster analysis is used to analyze the results of market surveys and focus groups in order to segment (cluster) the market to affect targeted marketing. In this example, the number of clusters may be assumed, but may not be known apriori. In some cases, cluster analysis is also used in image recognition applications, where the objective is to find objects or borders in images based only on bitmap information. In some cases, cluster analysis is used in biology for analysis of genes in genomics as well as in the study of evolution.

Figure 6:
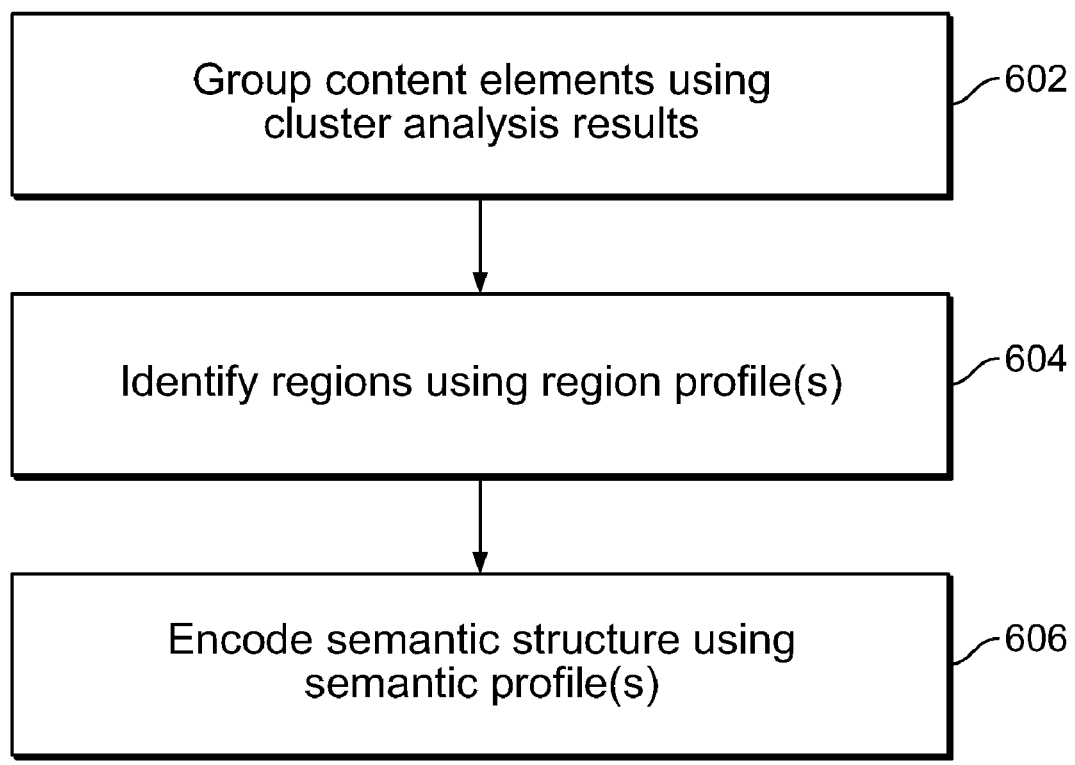
FIG. 6 is flow chart illustrating an embodiment of a process for encoding semantic structure.

FIG. 6 is flow chart illustrating an embodiment of a process for encoding semantic structure. In some embodiments, the process of FIG. 6 is included in 206 of FIG. 2. At 602, content elements are grouped using cluster analysis results. In some embodiments, one or more adjacent content elements are grouped together if the adjacent elements are within a distance value at least in part determined from the cluster analysis results. Multiple dimensions may be analyzed together. In some embodiments, the grouping is associated with a hierarchy of groupings. For example, a glyph is grouped in a word grouping, a line of text within a text box/column grouping, and a text box/column grouping. In some embodiments, attributes such as font and/or color is at least in part used in grouping content elements together. At 604, one or more regions are identified. In various embodiments, one or more region-profile(s) are or may if available and/or applicable be used to identify regions. A region profile can be expressed as a set of rules whose inputs are a collection of regions. These rules are expressed in conjunctive normal form, yielding true or false values that either accept or reject an aspect of the region. For example, a region-profile for tables might reject a region if it has no neighbors with corresponding geometric bounds. A profile interpreter is responsible for executing the region profiles. This engine evaluates each term in each rule. If all the terms in a sequence of conjuncts evaluate to true, the conjunct sequence is true. If any of the terms in the disjunct are true, the disjunct is true. In one embodiment, region profiles permit merging of regions, or adding properties to the elements of a region, or decomposition of a region into parts. For example, two paragraph groupings and/or column groupings are identified as being associated together as a single article and/or textbox. In some embodiments, the region profile is associated with one or more identified document types. For example, an identification of a paragraph is dependent upon the format of the source content (e.g., a word-processing document paragraph includes tab spaces that offset paragraphs whereas a web-page document paragraph does not have to include tab spaces). In some embodiments, regions are combined and/or split when the formed groups in 602 match a region profile. A region may be identified at least in part by using an indication received from a user. In some embodiments, by associating a region with an identification, one or more properties/attributes are associated with the region. For example, text flow of glyphs in the region is specified at least in part by the region profile, resulting for example in the ability to select, format, edit, and insert text within a column or other region, without affecting/selecting text in adjacent columns, proper word wrap within the column, etc.

In some embodiments, region analysis is performed. In some embodiments, a region includes a simple shape with non-overlapping boundary to another shape. Region Analysis includes using geometric information to identify regions of semantic import, such as the regions that contain sections, articles or table cells. The input to region analysis is drawn line segments and guide line segments deduced from the identification of aligned objects or object bounding boxes. In some embodiments, region analysis includes boundary traversal. In boundary traversal, line segments are first filtered to remove ones that may be part of content, rather than used to divide content. Then line segments are merged when they are parallel and the minimum distance between them is small compared to the page dimensions. In some circumstances, it is appropriate to join parallel lines that are not close, as long as the distance between their infinite extensions is small compared to the page dimensions, and the joined line does not subdivide content. After this merging of parallel lines, each resulting line segment is extended until the first intersection point with another line segment, in the case that there is a nearby line segment. When connecting a horizontal and a vertical line, a decision is made to whether extend the line to intersect with the other. If two divider lines (e.g., lines in a newspaper that divide articles) are to intersect as a "T" shaped intersection, the portion that would be the vertical part of "T" is extended when placed properly. If one line already intersects and extends beyond the other, the vertical part of the "T" joint is shrunk to exactly intersect with the horizontal part. After joining intersections, starting at the left side of the uppermost horizontal line (or other consistent corner), first right along a line is traversed, then turning clockwise at each successive intersection, if possible, or counterclockwise if not (or the reverse, as long as it is done consistently). If this process returns to the starting point, then the boundary of a region has been identified. This region is removed, and the whole process is followed once again on the remainder. If the process does not return to the starting point then it is because a line segment had a free end without intersection, and that line segment is removed before repeating the procedure. In some embodiments, region analysis includes region accumulation. In some embodiments, when previously identified regions overlap, the regions are merged together into a single region using region accumulation. For example, region accumulation is used to recognize that a floating image belongs in a text box, At 606, semantic structure is encoded. In various embodiments, one or more semantic profiles are or may if available and/or applicable be used to encode the semantic structure. In some embodiments, semantic profiles are expressed using the same language as region profiles, namely sets of conjunctive normal form rules. These rules rely on the attributes that have been added by the region profiles, plus additional information that is encoded in the rules. They allow regions to be grouped into larger structures with tagged content such as "article-date-author-text". In some embodiments, the semantic profile is associated with one or more semantic interpretation rules. An example of such rule associated with a "newspaper profile" is that "the first centered, capitalized, bold line of text following the subtitle of an article is the author, except in the case of regularly occurring columns, which have author name near a small picture and with a horizontal line underneath." In some embodiments, the semantic structure is encoded using one or more meta-languages. For example, semantic information is encoded using tags that specify semantic structural information not originally encoded in the source content. In some embodiments, the encoded semantic information is used in processing a search query. For example, search categories and/or fields are at least in part determined from the encoded semantic information. The semantic profile used in the semantic structure encoding is specified by a user and/or automatically determined. In some embodiments, a profile is selected is at least in part using one or more of the following: format of the source content, analysis of the source content, a desired processing associated with the source content, and a desired output format. In some embodiments, the encoding format is XML. Using XSLT (Extensible Stylesheet Language Transformations), the XML can be transformed to XHTML+CSS (Extensible Hypertext Markup Language+Cascading Style Sheet), SVG (Scalable Vector Graphics), XAML (Extensible Application Markup Language), and/or XSL:FO (Extensible Stylesheet Language Formatting Objects) which can be formatted to PDF (Portable Document Format). In some embodiments, the encoding format of the source content is maintained. For example, a source PDF document is encoded to an output PDF document with additional semantic structure information.

In some embodiments, a profile includes one or more instructions for analysis of content (e.g., procedure calls that are triggered by a system of pattern-matching rules). Profiles can be written in any computer language; such as a declarative, procedural or functional language; that is either interpreted at runtime or compiled for greater efficiency. In some embodiments, the profile language is rich enough to include one or more of the following: the ability to invoke pre-compiled clauses (e.g., with arguments), which are functions that act on the current state of the document object model to produce a Boolean result (e.g., a clause applicable to a word might be "The font size of all characters is less than 12 pt", and a clause applicable to two straight lines might be "The two lines are parallel"); the ability to apply logical connectives between clauses and evaluate the result (e.g., Conjunctive Normal Form expression is supported); the ability to invoke a sequence of pre-compiled actions, when a logical expression evaluates to true. (e.g., a precompiled action might be "Merge these two text boxes into one" and it might be triggered by the conjunction of the clauses "The text boxes overlap" and "The text boxes are aligned left"); and the ability to script the semantic reconstruction application or library and other applications or libraries on which it depends.

In various embodiments, given a starting content at least a portion of the following is performed.

1. Identify originating application for document.
2. Invoke application-specific profile.
3. Automate opening of document and printing to a drawing file format such as PDF through a virtual printer driver. (alternatively use specific format to drawing format converters for better results, e.g., use Apple WebKit to convert HTML+CSS, XML+XSLT, and other Web formats to PDF.)
4. Parse drawing file or stream.
5. Normalize drawing.
6. Identify horizontal content lines by common y value within a small relative tolerance.
7. Apply cluster analysis to x values of glyphs to identify words on a given content line.
    Example: 2-means cluster analysis on gaps between successive glyphs can be used to distinguish intra-word spacing from inter-word spacing. This is sufficient to identify just the words, which are the first level of horizontal clustering.
    Example: The difference clustering method can be used to determine the number of horizontal levels of clustering as well as the clusters at each level. This gives more information than just word clusters.
8. Apply cluster analysis to x values of words on a given line to identify text lines, which are sequences of words that go together on a single line.
    Example: 2-means cluster analysis on gaps between successive words can be used to distinguish intra-text-line spacing from inter-text-line spacing. This is sufficient to identify text lines, which are the second level of horizontal clustering.
    Example: The difference clustering method can be used to determine the number of horizontal levels of clustering as well as the clusters at each level. This gives more information than just text line clusters.
9. Group text lines to form columns.
10. Apply cluster analysis to x value of reference point in text lines to identify alignment along vertical axes (e.g., Left reference point, Center reference point, Right reference point, Decimal or other character reference point).
11. Use alignment information to recognize columns and nested lists.
12. Apply cluster analysis to y values of text lines to identify paragraphs within columns.
    Example: 2-means cluster analysis on gaps between successive text lines can be used to distinguish intra-paragraph spacing from inter-paragraph spacing. This is sufficient to identify paragraphs, which are the first level of vertical clustering.
    Example: The difference clustering method can be used to determine the number of vertical levels of clustering as well as the clusters at each level. This gives more information than just paragraph clusters.
13. Apply cluster analysis to y values of paragraphs to identify text boxes within columns.
    Example: 2-means cluster analysis on gaps between successive paragraphs can be used to distinguish intra-text-box spacing from inter-text-box spacing. This is sufficient to identify text boxes, which are the second level of vertical clustering.
    Example: The difference clustering method can be used to determine the number of vertical levels of clustering as well as the clusters at each level. This gives more information than just text box clusters.
14. Apply region analysis to identify sections, articles and other global regions.
15. Apply region analysis to identify tables, annotated diagrams and other local regions.
16. Invoke region-specific profiles to match content to semantic categories of each region type.
17. Identify document type or template by expert system techniques.
18. Invoke template-specific profile to match content to higher-level semantic categories.
19. Translate semantic DOM to target object model for application import, search or viewing purposes.

FIG. 7 is a diagram illustrating an example of a source content document. Document 700 includes text and images. In this example, document 700 is a PDF document generated from a virtual printer pipeline. Document 700 in this example is a printed output based on a PDF file that includes geometrical properties of the glyphs and images comprising document 700, color and other formatting information required to render them, and the location of each glyph and other image within the document 700, but does not include higher-level semantic structure. For example, glyph coordinates, curve parameters, and color information is included in the document, but information associated with grouping of glyphs that make up words, sentences, and paragraphs and whether the words represent titles or captions are not included in the document encoding.

FIG. 8 is a diagram illustrating an example of a document with grouped content elements. Document 800 is document 700 of FIG. 7 with higher semantic encoding. Using the processes of FIG. 2, FIG. 3, FIG. 4, and/or FIG. 6, document 700 has been up-converted to the higher semantic encoding of document 800. The boxes around the glyphs represent groupings of content elements. Groupings around individual words and lines of text are not shown to simplify the visual representation of the example. A hierarchy of groupings is included in the example. The grouped glyphs of the title and the grouped glyphs of the subtitle are grouped together in a higher grouping level. Glyphs in the body of the document are grouped into words, which are grouped into lines of text within columns, which are grouped into paragraphs as shown, which are grouped into columns as shown. The glyphs of the caption are separately grouped together from the body of the document and identified as a caption region. Using a region profile, the two columns are identified as belonging to the same article. Using a semantic profile, the title, the subtitle, the caption, and body columns of the document are identified and encoded as such. Due to semantic reconstruction, text automatically flows within column boundaries and if necessary flows from the bottom of the left column to the top of the right column, etc., when editing the body of the document, e.g., by selecting, inserting, or modifying text.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a semantic relationship, comprising:
    using a processor to perform cluster analysis using at least a portion of a source content; and using the processor to use a result of the cluster analysis to determine the semantic relationship between two or more content elements comprising the source content;
    wherein performing cluster analysis includes determining a set of first order differences each first order difference corresponding to a physical distance between adjacent content elements as positioned within the source content; ordering the set of first order differences into a prescribed order; determining a set of second order differences by computing for each first order difference a corresponding second order difference corresponding to a difference between that first order difference and a next nearest first order difference in the ordered set of first order differences; ordering the set of second order differences; and determining based at least in part on a cluster analysis of the ordered set of second order differences a number of levels into which content elements comprising the source content are organized;

wherein the cluster analysis is performed separately on the horizontal spacing between the elements from the vertical spacing between the elements.

2. A method as recited in claim 1, further comprising performing one or more of the following: receiving the source content, parsing the source content, creating an in-memory representation of the source content, and preparing the source content for cluster analysis.

3. A method as recited in claim 1, further comprising normalizing at least a portion of the source content.

4. A method as recited in claim 3, wherein the normalizing includes standardizing representation of at least a portion of the source content.

5. A method as recited in claim 1, further comprising extracting information associated with a layout or attributes of the source content and performing the cluster analysis using the extracted information.

6. A method as recited in claim 5, wherein the layout includes placement of visual elements of the source content, and attributes includes one or more visual aspects of elements of the source content.

7. A method as recited in claim 1, further comprising using the determined semantic relationship to up-convert the source content to a meta-language encoded representation.

8. A method as recited in claim 7, wherein the meta-language encoded representation includes an XML representation, and the XML representation is transformed using XSLT to one or more of the following formats: a PDF format, a XHTML+CSS format, a SVG format, a XSL:FO format, and a XAML format.

9. A method as recited in claim 1, wherein determining the semantic relationship includes encoding the source content with one or more additional semantic information than were available in the source content.

10. A method as recited in claim 1, wherein using a result of the cluster analysis includes enabling or performing a desired content processing.

11. A method as recited in claim 10, wherein the desired content processing includes importing, selecting, copying, pasting, editing, re-purposing, re-styling, searching, combining, transforming, or rendering content data at least in part by using the determined semantic relationship.

12. A method as recited in claim 10, wherein the desired content processing includes editing data associated with the source content in a font or a text flow pattern determined from the source content.

13. A system for determining a semantic relationship, comprising:
a memory configured to store data associated with a source content; and
a processor coupled to the memory and configured to perform cluster analysis using at least a portion of the source content, and use a result of the cluster analysis to determine the semantic relationship between two or more content elements comprising the source content;
wherein performing cluster analysis includes determining a set of first order differences each first order difference corresponding to a physical distance between adjacent content elements as positioned within the source content; ordering the set of first order differences into a prescribed order; determining a set of second order differences by computing for each first order difference a corresponding second order difference corresponding to a difference between that first order difference and a next nearest first order difference in the ordered set of first order differences; ordering the set of second order differences; and determining based at least in part on a cluster analysis of the ordered set of second order differences a number of levels into which content elements comprising the source content are organized;
wherein the cluster analysis is performed separately on the horizontal spacing between the elements from the vertical spacing between the elements.

14. A system as recited in claim 13, wherein the processor is further configured to perform one or more of the following: receiving the source content, parsing the source content, creating an in-memory representation of the source content, and preparing the source content for cluster analysis.

15. A system as recited in claim 13, wherein the processor is further configured to normalize at least a portion of the source content.

16. A system as recited in claim 13, wherein the processor is further configured to use the determined semantic relationship to up-convert the source content to a meta-language encoded representation.

17. A computer program product for determining a semantic relationship, the computer program product being embodied in a computer readable medium and comprising computer instructions for:
receiving source content;
performing cluster analysis at least in part by using at least a portion of the source content;
and using at least a portion of a result of the cluster analysis to determine the semantic relationship between two or more content elements comprising the source content;
wherein performing cluster analysis includes determining a set of first order differences each first order difference corresponding to a physical distance between adjacent content elements as positioned within the source content; ordering the set of first order differences into a prescribed order; determining a set of second order differences by computing for each first order difference a corresponding second order difference corresponding to a difference between that first order difference and a next nearest first order difference in the ordered set of first order differences; ordering the set of second order differences; and determining based at least in part on a cluster analysis of the ordered set of second order differences a number of levels into which content elements comprising the source content are organized; and
wherein the cluster analysis is performed separately on the horizontal spacing between the elements from the vertical spacing between the elements.

* * * * *

UNITED STATES PATENT AND TRADEMARK OFFICE
CERTIFICATE OF CORRECTION

| | | |
|---|---|---|
| PATENT NO. | : 7,899,826 B2 | |
| APPLICATION NO. | : 12/551118 | |
| DATED | : March 1, 2011 | |
| INVENTOR(S) | : Philip Andrew Mansfield et al. | |

It is certified that error appears in the above-identified patent and that said Letters Patent is hereby corrected as shown below:

In column 5, line 32, delete "$(p_1, \ldots, P_N)$" and insert -- $(p_1, \ldots, p_N)$ --, therefor.

In column 6, line 33, delete "X'n" and insert -- $X'_n$ --, therefor.

In column 6, line 33, delete "Xn" and insert -- $X_n$ --, therefor.

In column 6, line 34, delete "Wi" and insert -- $W_i$ --, therefor.

In column 7, line 63, delete "$(p_1, \ldots, P_N)$" and insert -- $(p_1, \ldots, p_N)$ --, therefor.

In column 11, line 67, delete "box," and insert -- box. --, therefor.

In column 16, lines 43, in claim 17, before "using" delete "and" and insert the same on col. 16, Line 42, after "content;".

Signed and Sealed this

Eighth Day of November, 2011

David J. Kappos
*Director of the United States Patent and Trademark Office*